350-418
E297Z

OR    3,617,114

[11] 3,617,114

| [72] | Inventor | Howard G. Rogers<br>Weston, Mass. |
| --- | --- | --- |
| [21] | Appl. No. | 13,607 |
| [22] | Filed | Feb. 24, 1970 |
| [45] | Patented | Nov. 2, 1971 |
| [73] | Assignee | Polaroid Corporation<br>Cambridge, Mass. |

[54] PLEOCHROIC SPECTACLES
7 Claims, 3 Drawing Figs.

| [52] | U.S. Cl. | 351/49,<br>350/154 |
| --- | --- | --- |
| [51] | Int. Cl. | G02c 7/12 |
| [50] | Field of Search | 351/49;<br>350/154, 157 |

[56] References Cited
UNITED STATES PATENTS 2,643,336   6/1953   Valensi............................ 350/157 UX

FOREIGN PATENTS 177,948   4/1922   Great Britain................ 351/49

*Primary Examiner*—David Schonberg
*Assistant Examiner*—Robert L. Sherman
*Attorneys*—Brown and Mikulka, William D. Roberson and Frederick H. Brustman ABSTRACT: Polarized prescription spectacles are furnished with lenses ground and polished from pleochroic crystals. Pleochroic crystals are readily polished to the contours required on ophthalmic lenses. The crystal is oriented with its principal absorption axis horizontal and at right angles to the lens axis. Sunglasses can be fitted with certain pleochroic crystals to reduce solar intensity for the wearer as well as glare from terrestrial sources.

PATENTED NOV 2 1971    3,617,114

INVENTOR.
HOWARD G. ROGERS

BY  Brown and Mikulka
    and
    Frederick H. Brustman
    ATTORNEYS

PLEOCHROIC SPECTACLES

BACKGROUND

This invention is concerned with polarized vision protective sunglasses. More particularly, it is concerned with sunglasses having lenses made from a polarizing material suitable for grinding and polishing to an ophthalmic prescription.

Outdoors most objects are made of dielectric materials illuminated in a generally downward direction by the sun. Horizontal surfaces, which predominate, are strongly illuminated and usually viewed obliquely. Light reflected obliquely from horizontal dielectric surfaces has a prominent polarization component with a horizontal vibration azimuth. Polarized sunglasses take advantage of this situation when they are selectively positioned to preferentially absorb light having a horizontal vibrational azimuth. In many situations polarized sunglasses have a special advantage attributed to their ability to remove glare present on horizontal surfaces while reducing the overall brightness of the scene. This particular feature is especially useful for automobile drivers and fishermen.

Polarized sunglasses which are generally available do not have prescription lenses. Stretch-oriented dichroic polymer sheets from which polarizers are commonly made do not lend themselves to prescription ophthalmic uses. Individuals requiring prescription eyeglasses to correct their vision are generally deprived of the benefits polarized lenses can provide. To fill the demand for polarized sunglasses by prescription eyeglass wearers, separate polarizing attachments have long been available to clip over normal corrective eyeglasses.

Some attention has been given to the problem of providing corrective lenses which are polarized. A great deal of effort has been devoted to laminating stretch-oriented dichroic polymeric materials onto or between glass or acrylic blanks. Prescriptions can be ground into the laminated assemblies as required. Lamination is difficult; delamination of the assembly is a strong possibility. Acrylic blanks are soft and easy to damage. Another alternative requires unidirectional rubbing of a finished glass lens and a subsequent addition of a dichroic dye to the abraded surface. The latter process requires individual handling of lenses and the polarizing surface is always exposed to damage.

It is an object of this invention to provide polarized vision correcting lenses.

Another purpose of this invention is to provide sunglasses having polarization absorbing lenses which can be readily polished to an ophthalmic prescription.

Yet another object of this invention is to provide polarizing sunglasses which can attenuate solar light sources relatively more than terrestrial sources.

These objects are obtained by providing sunglasses having lenses which are cut, ground and polished to a specific prescription from pleochroic polarizing crystals. When properly cut from a pleochroic crystal, the finished lens absorb specific polarization azimuths. It has a color tint, too. Standard ophthalmic processing methods for making glass lenses can be used to shape pleochroic crystals into lenses. When the object is solely to provide nonprescription polarizing sunglasses which attenuate sunlight more strongly than terrestrial light. The material from which the lenses are made is pleochroic, but need not be crystalline or hard.

Other objects of the invention will in part be obvious and will in part appear hereinafter.

The invention accordingly comprises the product possessing the features, properties and the relation of components which are exemplified in the following detailed disclosure, and the scope of the application which will be indicated in the claims.

For a fuller understanding of the nature of the objects of the invention, reference should be had to the following detailed description taken in connection with the accompanying drawing wherein.

Figure 1:
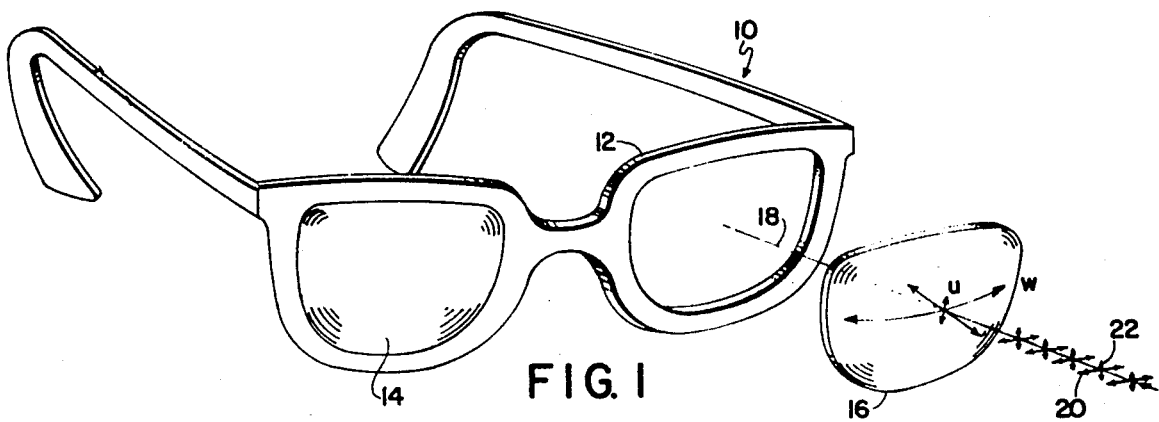
FIG. 1 is a partially exploded view of polarized sunglasses showing the relation of certain axes.

Polarized sunglasses 10 according to this invention are illustrated in FIG. 1. They comprise frame 12 and polarizing lenses 14 and 16 both ground and polished from pleochroic crystalline material. For clarity, pleochroic lens 16 is shown separated from polarized sunglasses 10. Optic axis 18 indicates the general direction of vision through lens 16. Standard optical techniques can be used to grind and polish lenses from pleochroic crystalline material. Using pleochroic crystals simplifies manufacture of polarized prescription lenses by eliminating the necessity for laminated construction or otherwise polarizing the lens in a subsequent operation. Vectors $u$, $v$, $w$ represent the three different absorption coefficients of a pleochroic crystal. Designation is arbitrary, $u$ being the smallest, $w$ the greatest. $v$ represents an intermediate value. Light absorption by pleochroic crystals is related to polarization. Each absorption vector is parallel to the vibrational azimuth; i.e., polarization azimuth, of the polarized light component it absorbs. Vector $w$, representing the strongest absorption coefficient, is shown horizontal and at right angles to the wearer's normal line of sight. Other orientations are possible; this one represents the optimum arrangement for polarized sunglasses to be used outdoors under normal bright lighting conditions. Maximum reduction of terrestrial brightness and glare is obtained by strongly absorbing the prevalent horizontal polarization component 20.

Light incident on pleochroic lens 16 in FIG. 1 can be considered to comprise two orthogonally polarized components, one having a horizontal vibrational azimuth 20, the other having a vertical vibrational azimuth 22. Typically, polarizers in sunglasses are oriented to absorb light with a horizontal vibrational axis 20. Horizontal polarization vector 20 is shown longer than vertical polarization vector 22 to indicate its greater brightness. Light of each polarization azimuth 20, 22 is absorbed in relation to the component sum of absorption vectors $u$, $v$, $w$ parallel to the respective polarization azimuth.

Figure 2:
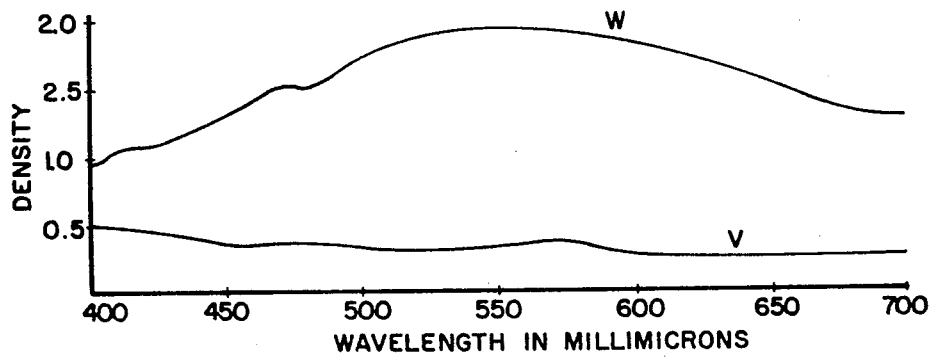
FIG. 2 illustrates some properties of the pleochroic crystal, cordierite.

FIG. 2 has two curves which are illustrative of the absorption properties which might be incorporated into sunglasses according to this invention using cordierite crystals for lens blanks. Absorption vector $w$ is greater than density 1.4 through most of the visible spectrum. Density is a logarithmic scale, base ten, in FIG. 2. 96 percent or more of a polarization component which has its vibration azimuth aligned with $w$ is absorbed by this illustrative lens. Absorption vector $v$ might absorb as much as half of a polarization component which has its vibrational azimuth aligned with it. Vector $u$ has negligible effect and is not shown in FIG. 2.

The important property of pleochroic materials used in practicing this invention is their density (absorption). Ideal pleochroic materials for use herein have absorption vectors which do not change with spectral wavelength. Direction dependent coloration of many pleochroic crystals is due to a strong variation of absorption with spectral wavelength.

Vector $w$, in addition to absorbing the brightness and glare from terrestrial sources, of course reduces the brightness of the sun by half, too. Solar radiation is randomly polarized. Polarizers absorb half of incident unpolarized or randomly polarized light. Because the sun is such a bright source, it is desirable to reduce its brightness by more than half. Pleochroic crystals exhibit relatively strong absorption in an alternate direction to the principal absorption axis $w$. Stretch oriented polymeric polarizers also exhibit absorption in alternate directions, but the magnitude of these alternate absorption vectors, at present, is too small to be of any practical use.

Figure 3:
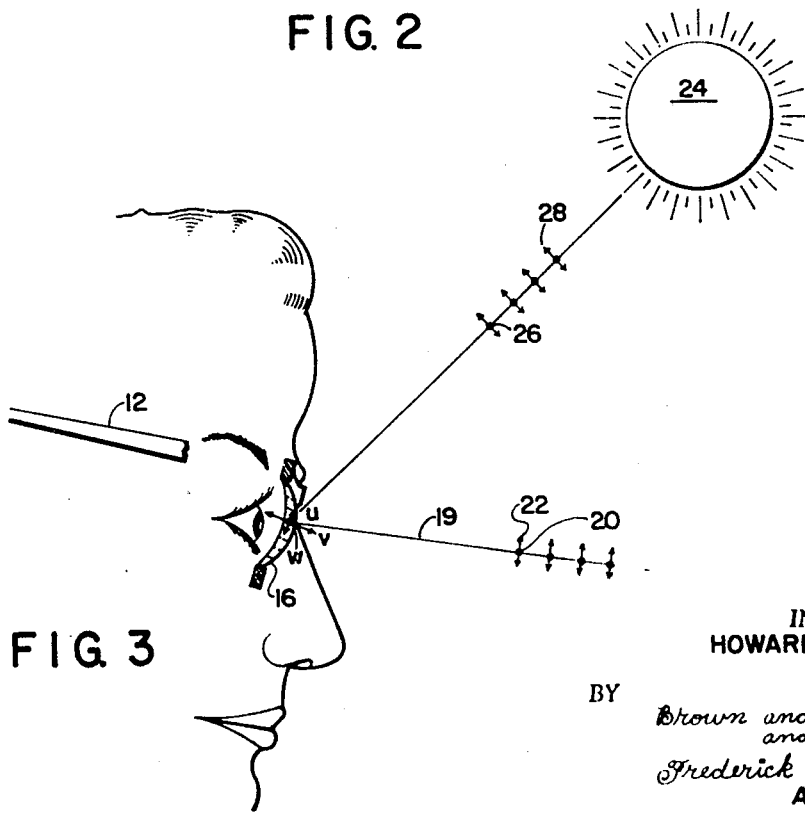
FIG. 3 shows the orientation of a pleochroic crystalline ophthalmic lens to reduce terrestrial and solar brightness.

FIG. 3 shows the appropriate orientation of the pleochroic crystal's absorption vectors $u$, $v$, $w$ to gain additional attenuation of solar brightness. Lens 16 is shown positions by frame 12 in front of a wearer'eye. Major absorption vector $w$ is perpendicular to the plane of the drawing, horizontal for the wearer, and orthogonal to the usual line of sight 19. Horizontal polarization component 20 is strongly attenuated by absorption vector w. Absorption vector w also attenuates the horizontal polarization component of solar radiation 26 emanating from the sun 24, shown almost overhead. As pointed out above, the extreme brightness of the sun makes it desirable to attenuate vertical polarization component 28, also. To achieve this result, the crystal from which lens 16 is made is oriented so its secondary absorption vector v is parallel or as shown tilted at a downward angle to the usual line of sight 19. It can now be appreciated that the component of absorption vector v, parallel to vertical polarization component of solar radiation 28, is much greater that the component parallel to vertical polarization component 22 of terrestrial radiation. Thus, absorption vectors v and w contribute strongly to attenuating solar radiation while only absorption vector w significantly attenuates terrestrial radiation. This tends to equalize the brightness of solar and terrestrial sources adding to the wearer's comfort.

There are two types of pleochroic crystals, dichroic and trichroic. Tourmaline is an example of the former. Cordierite is trichroic. Trichroic crystals have three values for u, v and w, dichroic crystals two.

Cordierite is suitable for use in sunglasses made according to this invention. While it does not exhibit the largest differences between absorption vectors known to exist, it does show significant useful differences throughout the visible spectrum. It can be manufactured artificially; see, for instance, Miyashiro et al., *American Journal of* Vol. CCLIII, p. 185 (1955). Obviously, other crystals besides cordierite can be used, whether naturally or artificially produced. Among the natural crystals suitable for use in practicing this invention are: cordierite; tourmaline; andalusite; kyanite; apatite; and benitoite.

The principles of this invention are applicable to making ophthalmic contact lenses having polarizing properties to attenuate bright light.

Certain changes may be made in the above product without departing from the scope of the invention herein involved. It is intended that all matter contained in the above description or shown in the accompanying drawing shall be interpreted as illustrative and not in a limiting sense.

What is claimed is:
1. Polarizing eyeglasses comprising, in combination:
   an eyeglass frame having at least one lens holding rim; and
   an ophthalmic lens fixedly mounted in said rim, said lens being formed from a trichroic material having a major absorption axis, an intermediate absorption axis, and a minor absorption axis, said major absorption axis being both horizontal and perpendicular to a line of sight through said ophthalmic lens.
2. Polarizing eyeglasses as described in claim 1 wherein said trichroic material is cordierite.
3. Polarizing eyeglasses as described in claim 1 wherein said intermediate absorption axis of said trichroic material is substantially parallel to said optic axis of said lens.
4. Polarizing eyeglasses comprising, in combination:
   frame means having a bridge element and two lens holding rims for positioning ophthalmic lenses before the eyes of the frame wearer; and
   a pair of ophthalmic lenses, each fixedly mounted in a respective one of said lens holding rims, each of said lenses being made from a trichroic material having its major absorption axis both perpendicular to the optic axis of the lens and horizontal, the intermediate absorption axis of said trichroic material being positioned at an acute angle downward from said optic axis.
5. Polarizing eyeglasses as described in claim 4 wherein said trichroic material is crystalline.
6. Polarizing eyeglasses as described in claim 5 wherein said trichroic crystalline material is cordierite.
7. A polarizing ophthalmic lens having an optic axis and formed from a trichroic pleochroic material having its intermediate absorption axis substantially parallel to said optic axis of said lens.